United States Patent [19]
Drake

[11] Patent Number: 5,040,489
[45] Date of Patent: Aug. 20, 1991

[54] AQUARIUM-PLANTER

[76] Inventor: Raymond A. Drake, 2729 New Haven Ave., Fort Wayne, Ind. 46803

[21] Appl. No.: 479,059

[22] Filed: Feb. 12, 1990

[51] Int. Cl.$^5$ ............................................. A01K 63/00
[52] U.S. Cl. ............................................. 119/5; 47/69
[58] Field of Search ........................... 119/5, 3; 47/69

[56] References Cited

U.S. PATENT DOCUMENTS

| | | | |
|---|---|---|---|
| 495,049 | 4/1893 | Lyon | 47/69 |
| 1,263,391 | 4/1918 | Eickemeyer | 119/5 |
| 1,838,215 | 12/1931 | DeClairmont | 119/5 |
| 1,991,683 | 2/1935 | Kelly | 119/5 |
| 3,848,358 | 11/1974 | Messmer | 47/69 |
| 3,992,811 | 11/1976 | Yellin | 47/69 |
| 4,285,164 | 8/1981 | Moore | 47/69 |
| 4,754,571 | 7/1988 | Riechmann | 119/5 X |

FOREIGN PATENT DOCUMENTS 1529801 10/1978 United Kingdom ................... 119/5

OTHER PUBLICATIONS

"It's His Personal Jungle", Sunset, Nov. 1964, p. 164.

Primary Examiner—Robert P. Swiatek
Assistant Examiner—Todd E. Manahan
Attorney, Agent, or Firm—Lundy and Associates

[57] ABSTRACT

An aquarium-planter comprises a bottom partition and at least one primary partition joined in a water retentive relationship. At least one divider is joined in water retentive relationship to the bottom partition and to the primary tank wall. The bottom partition, the primary tank wall and the divider define an aquarium tank which has a tank opening. A secondary partition is joined to the primary partition in spaced relation to the divider. The secondary partition and the divider define a planter. The partition has a drainage opening communicating the planter chamber. The aquarium-planter has a cover, which has about the same horizontal dimensions as the tank chamber opening. The cover is disposed in spaced vertical relation to the tank chamber opening.

21 Claims, 3 Drawing Sheets

AQUARIUM-PLANTER

BACKGROUND OF THE INVENTION

The present invention pertains to aquariums and to planters and more particularly pertains to an improved aquarium-planter.

The indoor culture of fish and the indoor culture of plants, as decorations, hobbies and the like, are very long established. Difficulties can arise, however, if an effort is made to combine the two by the use of aquatic plants in an aquarium. The light requirements of the plants must be met by the use of artificial lighting or the very careful use of filtered natural light. If an attempt is instead made to provide lighting by placing the aquarium, for example, in a window that receives direct sunlight, the aquatic plants will generally do well, however, the fish will be harmed by the resulting short term fluctuations in water temperature. These effects may be compensated for by using very large aquariums, using thermostatically controlled heaters in combination with lower ambient temperatures, and the like. These solutions are, however, generally too complex and impractical for application to relatively small aquariums in an ordinary home or office.

If sufficient light is provided to grow aquatic plants with fish, undesirable algae may grow uncontrollably. In addition to degrading the esthetic appearance of the aquarium, such growth, can render the aquarium uninhabitable by fish. The solutions generally applied to this problem include the use of algae consuming organisms, snails and filtration systems, which are usually only partially sucessful unless accompanied by an effort to restrict algae growth.

Growing terrestial plants, in the vicinity of an aquarium may have the same shortcomings as growing aquatic plants. An additional difficulty arises, if the terrestial plants are in the immediate vicinity of the aquarium in that the aquarium is subject to contamination by dead leaves, soil and other materials associated with the plants.

It is therefore highly desirable to provide an improved aquarium-planter.

It is also highly desirable to provide an improved aquarium-planter which allows the culture of fish and plants in a location subject to periods of direct natural lighting.

It is also highly desirable to provide an improved aquarium-planter which enhances the longevity of a good aquarium environment between cleanings.

It is also highly desirable to provide an improved aquarium-planter which provides for the culture of both fish and terrestrial plants.

It is also highly desirable to provide an improved aquarium-planter which limits algae growth.

It is also highly desirable to provide an improved aquarium-planter which provides for the cooperation and enhancement of both an aquaculture including both fish and plants and a terrestrial plant culture.

It is finally highly desirable to provide an improved aquarium-planter which provides all of the above desired features.

SUMMARY OF THE INVENTION

It is an object of the invention to provide an improved aquarium-planter.

It is another object of the invention to provide an improved aquarium-planter which allows the culture of fish and plants in a location subject to periods of direct natural lighting.

It is another object of the invention to provide an improved aquarium-planter which enhances the longevity of a good aquarium environment between cleanings.

It is another object of the invention to provide an improved aquarium-planter which provides for the culture of both fish and terrestrial plants.

It is another object of the invention to provide an improved aqarium-planter which limits algae growth.

It is another object of the invention to provide an improved aquarium-planter which provides for the cooperation and enhancement of both an aqua culture including both fish and plants and a terrestrial plant culture.

It is finally an object of the invention to provide an improved aquarium-planter, which provides all of the above desired features.

In the broader aspects of the invention, there is provided an aquarium-planter comprising a bottom partition and at least one primary partition joined in a water retentive relationship. At least one divider is joined in water retentive relationship to the bottom partition and to the primary tank wall. The bottom partition, the primary tank wall and the divider define an aquarium tank which has a tank opening. A secondary partition is joined to the primary partition in spaced relation to the divider. The secondary partition and the divider define a planter. The partition has a drainage opening communicating the the planter chamber. The aquarium-planter has a cover, which has about the same horizontal dimensions as the tank chamber opening. The cover is disposed in spaced vertical relation to the tank chamber opening.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
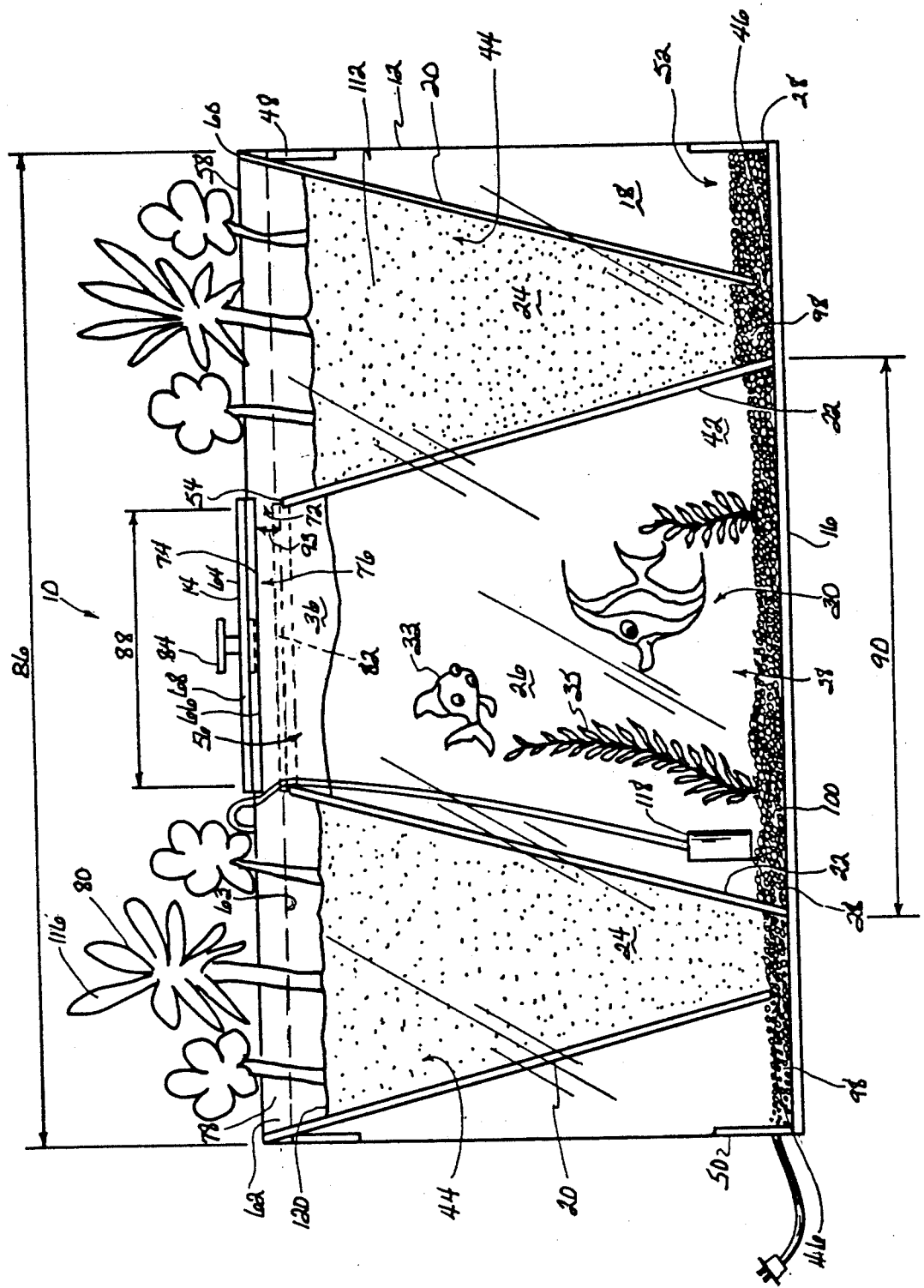
FIG. 1 is a side plan view of the aquarium-planter of the invention. The cover is shown in a first position in solid lines and in a second position in dashed lines. A plenum is also illustrated, in part, by dashed lines.
Figure 2:
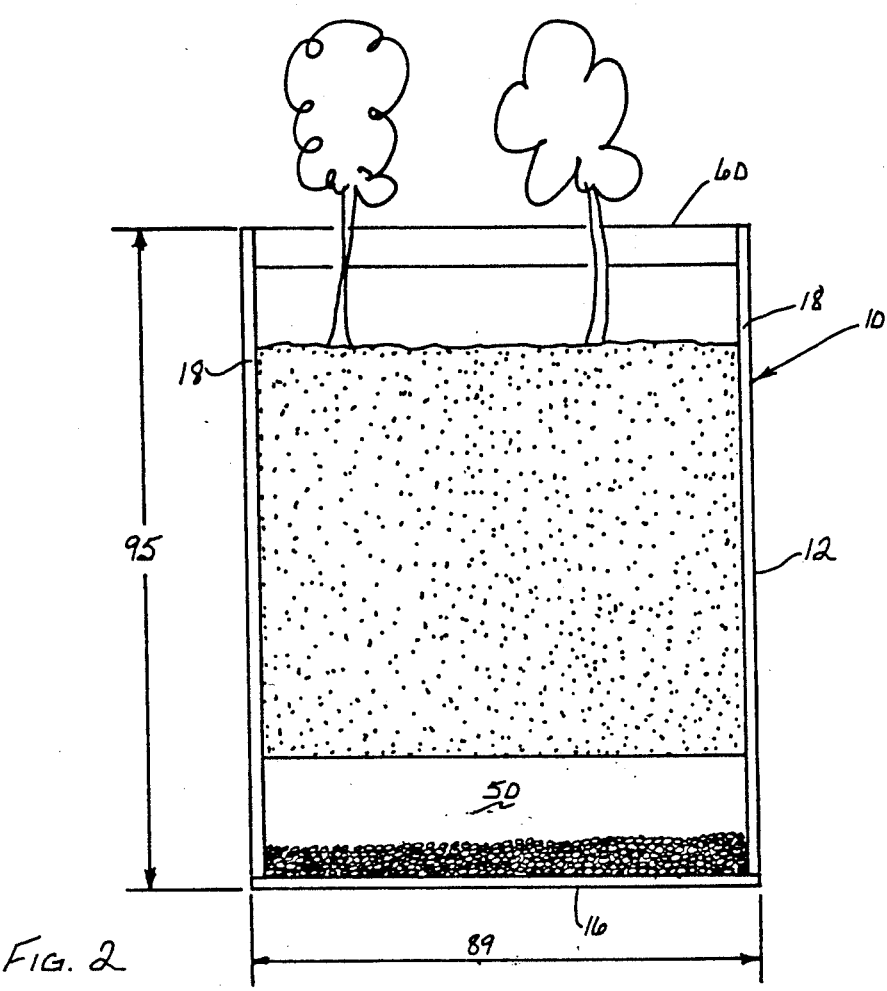
FIG. 2 is an end plan view of the aquarium-planter of the invention shown in FIG. 1.

Referring to the Figures, the aquarium-planter 10 of the invention is shown to have a body 12 and a cover 14. Body 12 has a bottom 16, and at least one primary partition 18, shown in FIG. 1 to enclose a rectangular shape and in FIG. 3 to be U-shaped. Body 12 also includes at least one secondary partition 20, and at least one divider 22. Each primary partition 18 is joined to each divider 22, secondary partition 20 and to bottom 16.

FIG. 1 shows one embodiment of aquarium-planter 10, which has two primary partitions 18, two secondary partitions 20 and two dividers 22. Primary partitions 18 are parallel. Dividers 22 are spaced apart and extend between primary partitions 18. Each primary partition 18 is unitary and continuous and includes a pair of primary planter walls 24. Primary tank walls 26 are between dividers 22. Primary planter walls are exterior of dividers 22. In other embodiments, planter walls 24 and tank walls 26 are not integral.

Primary partitions 18, dividers 22, and bottom 16 are joined together and sealed to preclude the movement of water through tank joints 28. Primary partitions 18, dividers 22 and bottom 16 define a tank chamber 30, within which water may be retained and fish 33 and aquatic plants 35 cultured. Tank chamber 30 has a neck 32, defined by upper portions 36, of primary tank walls 26 and dividers 22 respectively and a belly portion 38 defined by lower portions 42 of primary tank walls 26 and dividers 22, respectively. Dividers 22 are sloped upwardly and toward each other from bottom 16, thus one of the dimensions of neck 32 taken horizontally is less than the corresponding dimension of belly 38.

Secondary partitions 20, in the embodiment of the aquarium-planter 10 of the invention of FIG. 1, each extend between a pair of primary partitions 18. Each secondary partition 20, together with a respective divider 22, defines a planter chamber 44. Secondary partitions 20 are each sloped downwardly and toward tank chamber 30. Planter chambers 44 are thus trough or hopper shaped. Each secondary partition 20 includes a gap or drainage opening 46 adjacent bottom 16.

In the embodiment of aquarium-planter 10 of FIG. 1, adjacent secondary partitions 20, are a pair of struts 48. Struts 48 extend between primary partitions 18 and increase rigidity.

Exterior to planter chambers 44 are a pair of pan walls 50, which extend between primary partitions 18. Pan chambers 52, are defined by primary partitions 18, secondary partitions 20 and pan walls 50. Pan chambers 52 communicate through drainage openings 46 with planter chambers 44. Pan walls 50 are short in the embodiment illustrated in comparison to secondary partitions 20 and dividers 22. Pan chambers 52 are open to the ambient atmosphere free of obstruction. In another embodiment, pan walls 50 extend upwardly to the upper margins 58, 60 and are perforated to both access pan chambers 52 to the ambient atmosphere and to keep children's hands out of pan chambers 52.

Dividers 22 have upper edges 54 which define with primary partitions 18 opening 56. Primary partitions 18 and secondary partitions 20 have upper margins 58, 60. Upper edges 54 of dividers 22 are lower than upper margins 58, 60. Upper edges 54 and upper margins 58, 60 vertically delimit a plenum 62 which is bounded horizontally by primary partitions 18 and secondary partitions 20. The lower limit of plenum 62 is shown, in part, by a dashed line 63 in FIG. 1.

A cover 14 is supported by upper margins 58 of primary partitions 18 in a first position 64 in which cover 14 is horizontal and overlies tank chamber opening 56. Cover 14 in first position 64 vertically occludes tank chamber opening 56 and defines with edges 54 tank openings or passages 72. Openings 72 provide communication between tank chamber 30 and plenum 62.

Cover 14 has a lower segment 66, which has the same horizontal dimensions 88, 89 as tank chamber opening 56 and an upper segment 68 which has the same longitudinal horizontal dimension as tank chamber opening 56 between partitions 18. Upper segment 68 has a pair of opposed flange portions 70, which protrude beyond lower segment 66. Flange portions 70 engage upper margins 58 when cover 14 is in first position 64.

Openings 72 divide plenum 62 into an inner portion 76 and a pair of outer portions 78. Tank chamber 30 is isolated from the ambient atmosphere, except for atmosphere which enters or leaves through outer portion 78, through openings 72 and inner portion 76. Tank chamber 30 is also protected from foreign materials vertically by cover 14 and horizontally by primary partitions 18 and secondary partitions 20. Plants 80 growing in planter chambers 44, provide additional protection to tank chamber 30 from fast moving air currents passing through openings 72.

Cover 14 is removable from first position 64, for clean-out and the like. Cover 14 is rotated ninety degrees when moved from first position 64 to second position 82. In second position 82, flange portions 70 of upper segment 68 of cover 14 engage upper edges 54 of dividers 22 and longitudinal edges 74 adjoin primary tank walls 26 and tank opening 56 is completely occluded. Planter chambers 44 are accessible, without risk of contamination of tank chamber 30, when cover 14 is in second position 82. Cover 14 may include a handle (not shown) to make cover 14 easier to move.

In a specific embodiment, cover 14 is moveable when in second position 82 from its at rest position in which cover rests upon upper edges 54 of dividers 22 and totally occludes chamber opening 56 to its second position 82 and is positionable at any intermediate position between primary tank walls 26 thereby to adjust size of opening 72. In the specific embodiment illustrated, cover 14 is held in the intermediate positions by engagement of its opposite edges by the primary tank walls 26 and the resiliency thereof after cover 14 is placed therebetween. Alternatively, in another specific embodiment, dividers 22 adjacent upper edges 54 may be provided with openings (not shown) to provide the communication between tank chamber 30 and the ambient atmosphere when cover 14 is resting upon edges 54 of dividers 22. These openings are adjustable in size by providing a slideable plate affixed to each divider having holes therein which can be brought into registry with the holes in dividers 22 to provide for maximum communication between tank chamber 30 and the ambient atmosphere or moved out of registry to completely isolate chamber 30 from the ambient atmosphere or moved to intermediate positions or partially in registry positions to provide for the correct total area of openings 72 between tank chamber 30 and the ambient atmosphere.

The total area of openings 72 are less than the area of tank chamber opening 56, and in some embodiments desirably less than one-half the area of tank chamber opening 56, in other embodiments desirably less than one-third the area of tank chamber opening 56, and in still other embodiments desirably about equal to one-fifth the area of tank chamber opening 56. The most desirable adjustment depends upon the temperature and humidity of the ambient atmosphere and the aquatic and non-aquatic plants present in the aquarium planter.

Cover 14 in position 64 together with primary petitions 18 and dividers 22 and plants 80 effectively occlude fast moving air currents from blowing through plenum 62. In fact, the exchange of the atmosphere within tank 30 and the atmosphere within planter chambers 44 are only exchanged essentially by diffusion. Thus, when the moisture gradient or oxygen gradient between the atmosphere within tank 30 and the atmosphere within planters 44 is sufficient, both moisture and oxygen will move into the outer portions 78 of plenum 62. Similarly, whenever the carbon dioxide gradient in the plenum portions 78 is sufficient, carbon dioxide will move into the plenum portion 76 of the tank chamber 30. This controlled exchanged of atmosphere appears to enhance both the aquaculture of tank 30 and the plant culture of planter chambers 44.

The aquarium-planter 10 of FIG. 1 has the following area relationships to ensure the balance of environments and longevity of the aquaculture as described herein. The longest dimension 86 of body 12 of aquarium-planter 10 is three times the longitudinal dimension 88 of tank chamber opening 56 and cover 14. The length 90 of tank chamber 30 at bottom 16, in the same direction as the longest dimension 86 of body 12, is two times the longitudinal dimension 88 of tank chamber opening 56. The width 89 of body 12, cover 14 and tank chamber opening 56 are equal to longitudinal dimension 88, and the height 95 of body 12 is one and one-half times the longitudinal dimension 88. The volume of tank chamber 30 is about equal to the combined volume of planter chambers 44. The vertical dimension 93 of passages 72 is between about one-quarter inch and about one-half inch.

In other specific embodiments of the aquarium-planter 10 of FIG. 1, the longitudinal dimension 86 and the height dimension 95 are maximized and the width dimension is minimized such that the viewing area of the tank chamber 30 is maximized. However, this can only be accomplished so long as the area of the partitions 22 have sufficient size to accomplish the required heat transfer between the tank chamber 30 and the plant chambers 44. Thus, the aquarium-planter 10 designed to be indoors and out of natural sunlight may be dimensioned differently than an aquarium-planter 10 designed to sit in direct sunlight to provide more viewable area.

Figure 3:
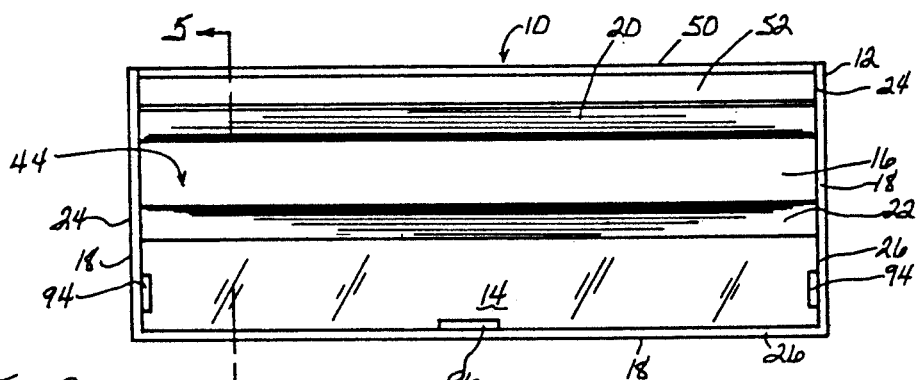
FIG. 3 is a top plan view of another embodiment of the aquarium-planter of the invention. The cover is shown in a first position.
Figure 4:
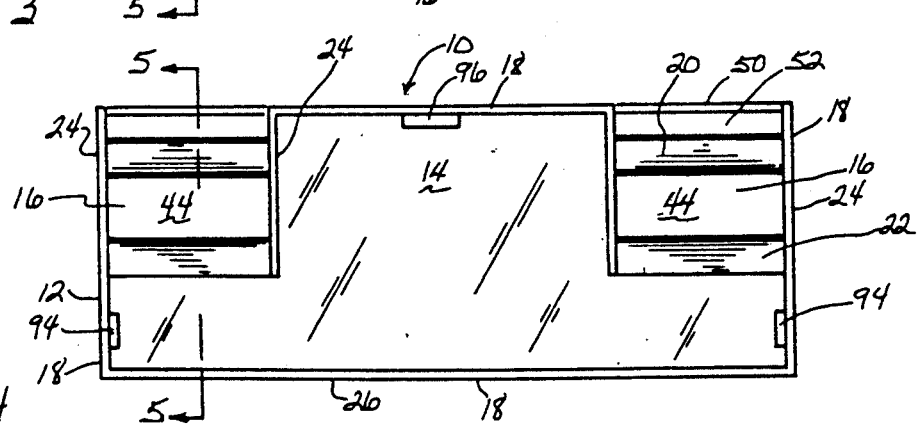
FIG. 4 is a top plan view of still another embodiment of the aquarium-planter of the invention. The cover is shown in a first position.
Figure 5:
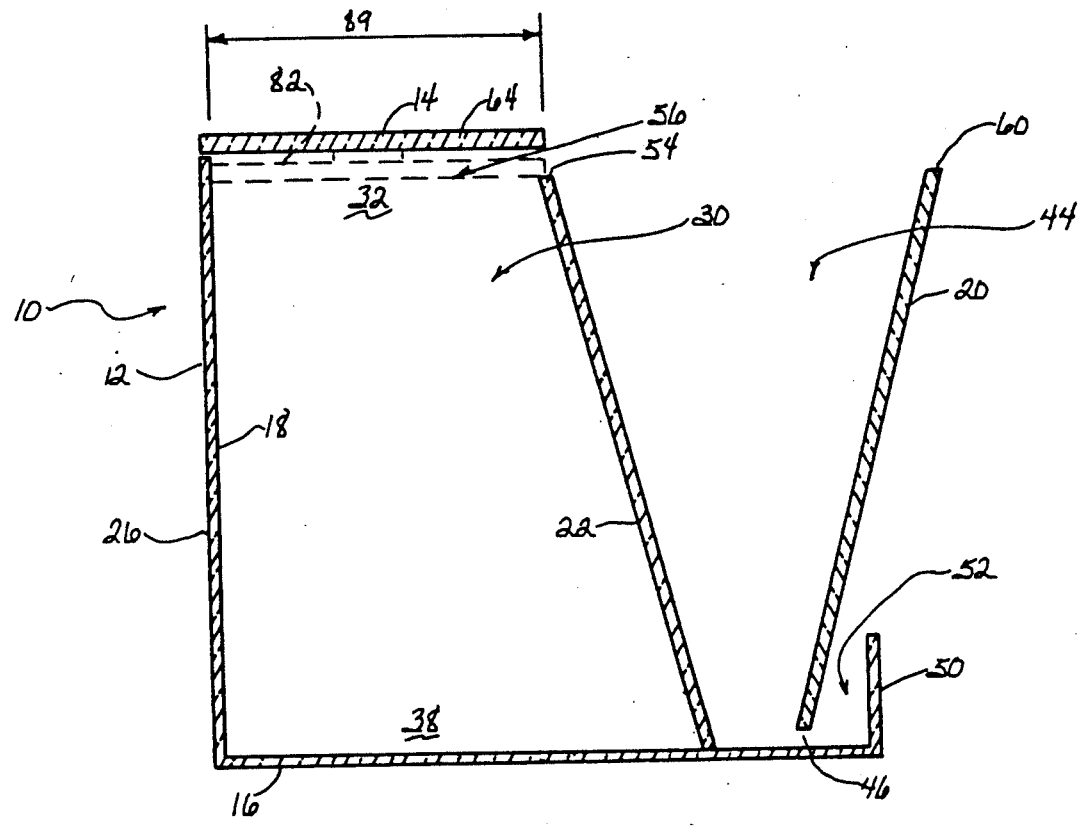
FIG. 5 is a cross-sectional view of the aquarium-planter of both FIGS. 3 and 4 taken along section lines 5—5. The cover is shown in a first position in solid lines and in a second position in dashed lines.
Figure 6:
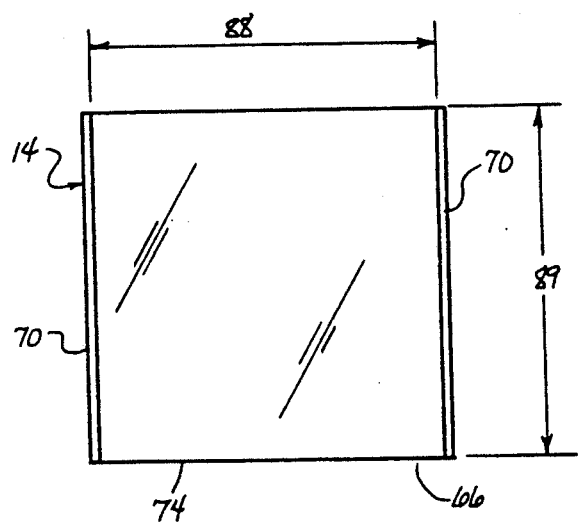
FIG. 6 is a bottom plan view of the cover of the aquarium-planter of the invention.

Alternative embodiments of aquarium-planter 10 are illustrated in FIGS. 3 through 5. The embodiment shown in FIGS. 3 and 5 has one primary partition 18, one divider 22, one secondary partition 20, and one pan wall 50. Cover 14 is supported in first position 64 by shelf member 94 which extend into tank chamber 30. Cover 14 is supported in second position 82 by a similar shelf member 96 acting in combination with upper edge 54.

The embodiment of the invention illustrated in FIGS. 4 and 5 is generally the same as that shown in FIGS. 3 and 5 except for the fact that the embodiment of FIGS. 3 and 5 has a single planter chamber 44 whereas the embodiment of FIGS. 4 and 5 have two planter chambers 44 separated by a portion of the tank 30. In the embodiment of the invention of FIGS. 4 and 5, planter portions 44 occupy two of the four corners of the aquarium planter 10. In the embodiment of the invention of FIGS. 3 and 5, planter 44 occupies one whole side of the aquarium planter 10.

Aquarium planters 10 of the invention may be constructed of a variety of materials. However, the most preferred are transparent glass or plastic sheet. Dividers 22 must be of a material that permits heat transfer therebetween for the planters tend to achieve the temperature moderating features of tank 30 herein described.

Again referring to FIG. 1, the aquarium-planter 10 has a pair of drainage beds 98 in the bottom of planter chambers 44 and respective pan chambers 52. Each drainage bed 98 is continuous from a pan chamber 52 to a planter chamber 44 through a drainage opening 46. Drainage beds 98 may be gravel or other similar horticulture materials. If desired, the same material may be used as a base layer 100 in tank chamber 30.

Tank chamber 30 is substantially filled with water 31 and aquaculture materials, such as a fish 33 and aquatic plants 35. Each planter chamber 44 is filled to about the same height above bottom 16 with horticultural materials, such as natural or synthethic soil 112. Terrestrial plants 80 are planted in the soil 112. Unless very short, above-ground portions 116 of terrestrial plants 80 are predominantly disposed above upper margins 58, 60 of primary partitions 18 and secondary partitions 20, and may overhang or contact cover 14.

In a specific embodiment, plant chambers 44 are each filled with a pot in which the horticultural materials such as natural or synthetic soil 112 is placed and the terrestrial plants 80 are planted. In the aquarium-planter 10 of FIG. 1, each planter chamber 44 has a single pot generally of a shape geometrically similar to planter chambers 44. In the aquarium-planter 10 illustrated in FIG. 3, planter 44 has a plurality of pots and the longitudinal length of the planter 44 is equal to the number of pots positioned therein. In the planter-aquariums illustrated in the drawings, each of the pots positioned in planter chambers 44 are in cross sections taken generally parallel to the bottom 16 are generally square or right-triangular. In other planters in which the planter chambers 44 are circular in cross section, the pots are circular in cross section. In still other planters in which the planter chambers 44 are triangular in cross section, the pots are triangular in cross section. This allows the terrestrial plants 80 to be rotated by removing the terrestrial plants and pots from the planter chambers 44, rotating them, and replacing them in the chambers 44. In the case of square planters, rotation can be in increments of 90 degrees; In the case of circular planters, any number of degrees desired; In the case of equilateral triangular pots, 60 degrees.

In use, aquarium-planter 10 provides a micro-environment which offers on a continuous basis different and more stable conditions than are available in the general environment or are generally available in fish tanks or containers for plants. Movement of air through tank chamber 30 is restricted limiting the exchange of gases to a rate substantially controlled by diffusion. The exchange of carbon dioxide and oxygen between tank chamber 30 and the ambient environment is altered, such that carbon dioxide is apparently reduced. This moderates the rate of growth of water plants 35 and algae.

Soil 112 and other horticultural materials within the planter chambers 44 act as a thermal mass, which moderates temperature changes in the aquarium-planter 10 as a whole. In addition, pan chambers 52 and drainage beds 98 provide evaporative cooling of aquarium-planter 10 as temperatures rise. Unlike open fish tanks, evaporative cooling is provided for tank chamber 30 without accompanying evaporation losses of water 31 from tank chamber 30. Soil surfaces 120 and terrestial plants 80 provide some additional evaporative cooling. Water loss, from soil surfaces 120, is minimized by the presence of air-borne moisture from tank chamber 30, within outer portion 78 of plenum 62 over soil surfaces same depth in each aquarium-planter. That depth was within about an inch of full capacity in all cases.

TABLE 1

|  | EXAMPLES | | | |
| --- | --- | --- | --- | --- |
|  | I | II | III | IV |
| Nominal Inside Dimensions | | | | |
| (width × height × length in inches) | 4 × 6.5 × 12 | 4 × 6.5 × 12 | 4 × 6.5 × 12 | 4 × 6.5 × 12 |
| Cover 14 | | | | |
| nominal dimensions (width × length in inches) | No Cover | 4 × 4 | 4 × 4 | 4 × 4 |
| slots or openings 72 (height in inches) | | No Slots | ⅛ | 4/16 |
| Planter Chamber | | | | |
| number of chambers 44 | 2 | 2 | 2 | 2 |
| total volume (in cubic inches) | 72 | 100 | 100 | 100 |
| Tank Chamber 30 | | | | |
| total volume (in cubic inches) | 99 | 115 | 115 | 115 |
| Observations of Tank Chamber 30 | | | | |
| water clarity | Remained Clear | Algae Overgrowth | Remained Clear | Remained Clear |
| water evaporation rate | Rapid | Minimal | Moderate | Moderate |
| condition of water plants | Failed | Excessive Overgrowth | Healthy/ Moderate Growth | Healthy/ Moderate Growth |
| condition of fish | Healthy | Unacceptable | Healthy | Healthy |
| temperature fluctuation in site exposed to daylight | Acceptable | Acceptable | Acceptable | Acceptable |

120.

Otherwise, aquarium-planter 10 of the invention is used in a manner similar to conventional aquariums and potted plants, with some exceptions. Choosing a location to avoid daylight is not necessary. Measures taken to increase local humidity for the terrestial plants 80 are generally unnecessary. Evaporation losses are reduced. Problems of contamination of water 31 with terrestial plant materials are minimized. Temperature fluctuations, both long and short term, are reduced in comparison to fish tanks which are not thermostatically heated. If it is desired to increase the median temperature of the water 31, a non-thermostatically controlled heater 118 may be used.

The following examples are presented herein to more fully illustrate the present invention. While specific dimensions are described in these examples, it should be understood that a variety of aquarium-planters 10 are within the scope of the inveniton and it is well within the skill of a person skilled in the art to produce such aquarium-planters 10 in accordance with the invention disclosed herein.

EXAMPLES I–IV

In each of the following Examples, the aquarium-planter 10 was operated for a minimum of three days under the same conditions of room temperature, and natural lighting including some exposure to direct sunlight through an ordinary glass window. All the aquarium-planters were made of transparent glass and glued together. The dimensions and capacities of the aquarium-planters are indicated in Table I. Nominal inside dimensions are the approximate dimensions of the aquarium-planters ignoring intervening structural members and variations in glass thickness and the like. Covers used had the overall horizontal dimensions indicated and tank chamber openings 72 had the indicated dimensions. Drainage beds and bottom layers of fine gravel of about one inch in depth were present in all the aquarium-planters. Planter chambers and tank chambers were filled, with soil and water, respectively, to about the same depth in each aquarium-planter. That depth was within about an inch of full capacity in all cases.

Aquarium planter 10 as shown in FIG. 1 can achieve all of the objects of the invention when made in different sizes. The capacities of the aquarium planter 10 as shown in FIG. 1 a variety of sizes are dimensioned in Table 2. Each of the aquarium planters 10 described in Table 2 includes a tank chamber 30 which has a volume about equal to or greater than the total volume of plant chambers 44.

TABLE 2

| CAPACATIES OF AQUARIUM-PLANTER 10 AS SHOWN IN FIG. 1 | | | |
| --- | --- | --- | --- |
| Size Inches | Tank 30 | Rt. Hand Planter | Lt. Hand Planter |
| Cap 14 (3 × 3) Partition 18 (4½ × 9) | 0.25 gal. | 0.4 qts. | 0.4 qts. |
| Cap 14 (4 × 4) Partition 18 (7 × 12) | 0.7 gal. | 1.2 qts. | 1.2 qts. |
| Cap 14 (5 × 5) Partition 18 (7½ × 15) | 1.4 gal. | 2.15 qts. | 2.15 qts. |
| Cap 14 (6 × 6) Partition 18 (9 × 18) | 2.1 gal. | 3.7 qts. | 3.7 qts. |
| Cap 14 (3 × 8) Partition 18 (10 × 16) | 1.24 gal. | 1.25 qts. | 1.25 qts. |
| Cap 14 (4 × 12) Partition 18 (16 × 24) | 4.5 gal. | 4.0 qts. | 4.0 qts. |
| Cap 14 (3 × 8) Partition 18 (12 × 16) | 1.5 gal. | 1.5 qts. | 1.5 qts. |
| Cap 14 (4 × 8) Partition 18 (12 × 16) | 2.0 gal. | 2.0 qts. | 2.0 qts. |
| Cap 14 (5 × 8) Partition 18 (12 × 16) | 2.6 gal. | 2.62 qts. | 2.62 qts. |
| Cap 14 (5 × 10) Partition 18 (15 × 20) | 4.2 gal. | 4.3 qts. | 4.3 qts. |

In a specific embodiment of the aquarium-planter 10 of the invention constructed as illustrated in FIG. 1 and dimensioned such as Example III was first placed to service in September, 1987. The terrestrial plants have grown well, and both the aquatic plants and fish have thrived through March of 1989 without a water change of excessive algae formation.

The aquarium-planter 10 of the invention has been found acceptable for guppies, grommies, platys, mollies, barbs, sordtails, goldfish, rerio (zebra) and tetra fish.

The aquarium planter of the invention allows the culture of fish for extended lengths of time even when subjected to periods of direct natural lighting, enhances the culture of both fish and terrestrial plants, and limits algae growth. By the aquarium planter 10 structure, plants can be nurtured adjacent to an aquaculture without the plant culture contaminating the aquaculture. The plant culture of the invention moderates the temperature fluctuation of the aquaculture and overall enhances the aquaculture over prolonged periods of time.

While a specific embodiment of the invention has been shown and described herein for purposes of illustration, the protection afforded by any patent which may issue upon this application is not limited strictly to the disclosed embodiment but rather extends to all structures and arrangements which fall fairly within the scope of the claims which are appended hereto:

What is claimed is:

1. An aquarium-planter comprising a bottom partition, at least one primary partition joined in water retentive relationship to said bottom partition, a divider joined in water retentive relationship to said bottom partition, said bottom partition and at least one said primary partition and said divider defining a tank chamber opening, a secondary partition joined to in water retentive relationship to said at least one primary partition in spaced relation to said divider, said secondary partition and said divider defining a planter chamber, and a cover having about the same horizontal dimensions as said tank chamber opening, said cover being disposed in a first position in spaced vertical relation to said tank chamber opening and divider, whereby communication is provided between said tank chamber and said planter chamber over said divider, heat transfer is provided between said tank chamber and said planter chamber through said divider, and said tank chamber is isolated from the ambient atmosphere except from said planter chamber.

2. The aquarium-planter of claim 1 further comprising a pan wall spaced from said planter chamber, said pan wall defining with opposite portions of said secondary partition a pan chamber communicating with said planter chamber through said drainage opening in said secondary partition.

3. The aquarium-planter of claim 1 wherein said at least one primary partition has an upper margin, wherein said tank chamber opening is below said upper margin and wherein said upper margin supports said cover in said first position.

4. The aquarium-planter of claim 3 wherein said divider has an upper edge and wherein said upper margin and said upper edge vertically delimit a plenum, said plenum being bounded horizontally by said primary and secondary partitions.

5. The aquarium-planter of claim 1 wherein said at least one primary partition includes a primary tank wall, and wherein each said primary tank wall and divider has a neck portion and a belly portion, said neck portions together defining a tank chamber neck, said belly portions together defining a tank chamber belly, said tank chamber neck having at least one smaller horizontal dimension than said tank chamber belly and said divider being longer than the distance between said tank chamber opening and said bottom partition.

6. The aquarium-planter of claim 1 wherein the volume of said tank chamber is equal to or greater than the volume of said planter chamber.

7. The aquarium-planter of claim 1 wherein said cover in said first position is disposed on said primary partition.

8. An aquarium-planter comprising a bottom, a pair of opposed primary partitions adjoining said bottom, a pair of opposed secondary partitions adjoining each of said primary partitions and said bottom, said primary and secondary partitions each having an upper margin, a pair of dividers adjoining said bottom and said primary partitions interior of said secondary partitions, said primary and secondary partitions each being joined in water retentive relation with each other, said dividers each being joined in water retentive relation with said bottom and primary partitions, said dividers each having an upper edge, said upper edges being below said upper margins, said dividers and said primary partitions defining a tank chamber having a neck and a belly, said neck having a shorter longitudinal horizontal dimension than said belly, said dividers and said primary and secondary partitions defining a pair of opposed planter chambers, and a cover removably disposed in a first position on said upper margins of said primary partitions, said cover vertically occluding said tank chamber, said cover in said first position and said upper edges of said dividers defining a pair of tank passages which provide communication between said tank chamber and said planter chambers, said tank chamber being isolated from the ambient atmosphere except through said tank passages and said planter chambers, wherein heat transfer is provided between said tank chamber and said planter chambers through said dividers.

9. The aquarium-planter of claim 8 further comprising a pair of pan walls adjoining said primary partitions exterior to said secondary partitions, said pan walls and said primary partitions defining a pair of pan chambers communicating with respective one of said planter chambers.

10. The aquarium-planter of claim 8 wherein said cover is movable between said first position and a second position, said cover, in said second position, completely occluding said tank chamber.

11. The aquarium-planter of claim 10 wherein said cover in said movement, between said first position and said second position, is subject to a rotation through ninety degrees in a horizontal plane.

12. The aquarium-planter of claim 10 wherein said cover in said second position is disposed on said upper edges.

13. The aquarium-planter of claim 8 wherein said planter chambers, together, have about the same volume as said tank chamber.

14. The aquarium-planter of claim 8 wherein said passages each have a vertical dimension between about one-quarter inch and about one-half inch.

15. The aquarium-planter of claim 8 wherein said tank chamber has a uniform width and a length at said bottom, about twice the longitudinal dimension of said tank chamber opening in the same direction.

16. The aquarium-planter of claim 8 further comprising a pair of drainage beds, said drainage beds each being disposed within respective ones of said planter chambers.

17. The aquarium-planter of claim 8 further comprising water substantially filling said tank chamber and soil substantially filling said planter chambers to about the same vertical depth as said water.

18. The aquarium-planter of claim 8 wherein said upper margins and said upper edges vertically delimit a plenum, said plenum being bounded horizontally by said primary and secondary partitions, said plenum being divided by said passages into an inner portion and a pair of outer portions and wherein said tank chamber is isolated from entry of ambient air except through said outer portions and said passages and said inner portion.

19. An aquarium-planter comprising a bottom partition, a primary partition joined in water retentive relation to said bottom partition, said primary partition including a primary tank wall and a primary planter wall, said primary tank wall having an upper margin, a divider joined in water retentive relation to said bottom partition and to said primary tank wall, said divider having an upper edge, said upper edge being lower than said upper margin, said bottom partition and said primary tank wall and said divider defining a tank chamber having a tank chamber opening bordered by said upper edge, a secondary partition joined in water retentive relation to said primary partition exterior to said divider, said secondary partition and said divider defining a planter chamber having a volume about equal to the volume of said tank chamber, at least one pan wall disposed exterior to said planter chamber, each said pan wall being joined to and defining with said primary partition a pan chamber, said secondary partition having a drainage opening therein connecting said planter chamber and with one of said pan chambers, a cover disposed in a first position engaging said upper margin, said cover in said first position defining a passage with said divider, said cover being movable between said first position and a second position, said cover in said second position occluding said tank chamber opening, water substantially filling said tank chamber and soil substantially filling said planter chamber to about the same vertical depth as said water whereby communication is provided between said tank chamber and said planter chamber over said divider, heat transfer is provided between said tank chamber and said planter chamber through said divider, and said tank chamber is isolated from the ambient atmosphere except from said planter.

20. The aquarium-planter of claim 19 further comprising terrestrial plants disposed in said planter chambers, and terrestrial plants having above-ground portions extending above said upper margins.

21. An aquarium-planter comprising a bottom partition, at least one primary partition joined in water retentive relationship to said bottom partition, a divider joined in water retentive relationship to said bottom partition, said bottom partition and at least one said primary partition and said divider defining a tank chamber opening, said bottom partition and said divider defining a planter chamber, and a cover having about the same horizontal dimensions as said tank chamber opening, said cover being disposed in a first position in spaced vertical relation to said tank chamber opening and divider, whereby communication is provided between said tank chamber and said planter chamber over said divider, heat transfer is provided between said tank chamber and said planter chamber through said divider, and said tank chamber is isolated from the ambient atmosphere except from said planter chamber.

* * * * *